(12) United States Patent
Harbach et al.

(10) Patent No.: US 10,373,378 B2
(45) Date of Patent: Aug. 6, 2019

(54) AUGMENTED REALITY SYSTEM FOR VEHICLE BLIND SPOT PREVENTION

(71) Applicants: Andrew Paul Harbach, Argyle, TX (US); Bruce Lee, Denton, TX (US)

(72) Inventors: Andrew Paul Harbach, Argyle, TX (US); Bruce Lee, Denton, TX (US)

(73) Assignee: PACCAR INC, Seattle, WA (US)

( * ) Notice: Subject to any disclaimer, the term of this patent is extended or adjusted under 35 U.S.C. 154(b) by 0 days.

(21) Appl. No.: 14/751,891

(22) Filed: Jun. 26, 2015

(65) Prior Publication Data

US 2016/0379411 A1    Dec. 29, 2016

(51) Int. Cl.
| | | |
|---|---|---|
| *B60R 1/00* | (2006.01) | |
| *B60R 1/08* | (2006.01) | |
| *B60R 1/12* | (2006.01) | |
| *G06F 3/14* | (2006.01) | |
| *G06K 9/00* | (2006.01) | |

(Continued)

(52) U.S. Cl.
CPC .............. *G06T 19/006* (2013.01); *B60R 1/00* (2013.01); *B60R 1/081* (2013.01); *B60R 1/12* (2013.01); *B60R 11/0235* (2013.01); *G06F 3/147* (2013.01); *G06F 3/1423* (2013.01); *G06K 9/00791* (2013.01); *G09G 5/003* (2013.01); *H04N 5/23238* (2013.01); *B60R 2001/1215* (2013.01); *B60R 2001/1253* (2013.01); *B60R 2011/0017* (2013.01); *B60R 2300/307* (2013.01); *B60R 2300/50* (2013.01);

(Continued)

(58) Field of Classification Search
None
See application file for complete search history.

(56) References Cited

U.S. PATENT DOCUMENTS

| | | |
|---|---|---|
| 5,530,421 A | 6/1996 | Marshall |
| 5,907,293 A | 5/1999 | Tognazzini |

(Continued)

FOREIGN PATENT DOCUMENTS

| | | |
|---|---|---|
| DE | 100 35 223 A1 | 1/2002 |
| DE | 10 2012 213132 A1 | 5/2014 |

(Continued)

OTHER PUBLICATIONS

Shao-Chi Chen, Hsin-Yi Chen, Yi-Ling Chen, Hsin-Mu Tsai, Bing-Yu Chen, "Making in-Front-of Cars Transparent—Sharing First-Person-Views via Dashcam", Nov. 7, 2014, Pacific Graphics, vol. 33.*

(Continued)

*Primary Examiner* — YuJang Tswei
(74) *Attorney, Agent, or Firm* — Christensen O'Connor Johnson Kindness PLLC

(57) ABSTRACT

The present disclosure relates to systems and methods for providing various types of information to a vehicle driver. Such information can be used by the vehicle driver singularly or in conjunction with other information available to the vehicle driver in order to allow the driver to operate the vehicle in an increasingly safe manner and/or to reduce the likelihood of property damage and/or possible bodily injuries to the driver, etc. In some instances, such information is presented to the driver as an augmented reality environment such that the driver can "see through" objects that may be occluding the driver's vision.

19 Claims, 10 Drawing Sheets

(51) Int. Cl.
*G09G 5/00* (2006.01)
*B60R 11/00* (2006.01)
*B60R 11/02* (2006.01)
*G06F 3/147* (2006.01)
*G06T 19/00* (2011.01)
*H04N 5/232* (2006.01)

(52) U.S. Cl.
CPC ............... *B60R 2300/8026* (2013.01); *G06T 2207/30252* (2013.01); *G09G 2380/10* (2013.01)

(56) References Cited

U.S. PATENT DOCUMENTS

| | | | |
|---|---|---|---|
| 6,424,272 | B1 | 7/2002 | Gutta |
| 6,693,519 | B2 | 2/2004 | Keirstead |
| 7,307,655 | B1 | 12/2007 | Okamoto |
| 7,378,947 | B2 | 5/2008 | Daura Luna |
| 7,379,813 | B2 | 5/2008 | Kubota |
| 7,466,338 | B2 | 12/2008 | Xie |
| 7,593,811 | B2 | 9/2009 | Schmidt |
| 7,852,462 | B2 | 12/2010 | Breed |
| 7,974,444 | B2 | 7/2011 | Hongo |
| 8,199,975 | B2 | 6/2012 | Pomerleau |
| 8,310,353 | B2 | 11/2012 | Hinninger |
| 8,400,507 | B2 | 3/2013 | Grigsby |
| 8,427,288 | B2 | 4/2013 | Schofield |
| 8,583,329 | B2 | 11/2013 | Breed |
| 8,670,035 | B2 | 3/2014 | Robert |
| 8,744,666 | B2 | 6/2014 | Switkes |
| 2004/0001074 | A1* | 1/2004 | Oyaizu .................. G06T 15/10 345/633 |
| 2006/0262140 | A1* | 11/2006 | Kujawa ................ G06T 7/0044 345/633 |
| 2009/0048750 | A1* | 2/2009 | Breed .................... G08G 1/161 701/70 |
| 2009/0231431 | A1 | 9/2009 | Grigsby et al. |
| 2012/0062741 | A1 | 3/2012 | Stimel, Jr. |
| 2013/0107044 | A1 | 5/2013 | Azevedo |
| 2013/0107045 | A1 | 5/2013 | Soderlind |
| 2013/0321628 | A1 | 12/2013 | Eng |
| 2014/0009589 | A1 | 1/2014 | Gloger |
| 2014/0055616 | A1 | 2/2014 | Corcoran et al. |
| 2014/0063255 | A1 | 3/2014 | Breed |
| 2014/0071278 | A1 | 3/2014 | Assaf |
| 2014/0139676 | A1 | 5/2014 | Wierich |
| 2014/0340516 | A1* | 11/2014 | Vojtisek .................. B60R 1/00 348/148 |
| 2014/0341434 | A1 | 11/2014 | Lin et al. |
| 2015/0130790 | A1* | 5/2015 | Vasquez, II ........... G06T 19/006 345/419 |
| 2015/0245017 | A1* | 8/2015 | Di Censo ........... H04N 13/0425 348/51 |
| 2016/0012574 | A1* | 1/2016 | Li .............................. G06T 5/20 345/419 |
| 2016/0257199 | A1* | 9/2016 | Bark ...................... B60K 35/00 |

FOREIGN PATENT DOCUMENTS

| | | |
|---|---|---|
| EP | 2 168 815 B1 | 3/2015 |
| WO | 2014/130049 A1 | 8/2014 |

OTHER PUBLICATIONS

Sucam, "Wired Truck RV Quad Split screen backup CCD camera monitor Trailer Rear View Backup Wireless Camera RV", May 3, 2015, Sucam.*

"Backup Camera for Semis—Triple Camera System—7.0 Inch Color Monitor," <http://www.worktruckoutfitters.com/blind-spot-camera-system-for-semis-three-cameras-7-in-monitor.html> [retrieved Aug. 4, 2014], 2 pages.

International Search Report and Written Opinion dated Oct. 6, 2016, issued in corresponding International Application No. PCT/US2016/039234, filed Jun. 24, 2016, 6 pages.

Supplementary Partial European Search Report, dated Dec. 11, 2018, issued in corresponding European Application No. 16815372.4, filed Jun. 24, 2016, 13 pages.

* cited by examiner

AUGMENTED REALITY SYSTEM FOR VEHICLE BLIND SPOT PREVENTION

BACKGROUND

People are more mobile than ever before. The number of cars, trucks, buses, recreational vehicles, and sport utility vehicles (collectively "automobiles") on the road appears to increase with each passing day. Moreover, the ongoing transportation explosion is not limited to automobiles. A wide variety of different vehicles such as motorcycles, trains, light, medium, and heavy duty trucks, construction equipment, and other transportation devices (collectively "vehicles") are used to move people and cargo from place to place. While there are many advantages to our increasingly mobile society, there are also costs associated with the explosion in the number and variety of vehicles.

Accidents are one example of such a cost. The vehicle and automobile industry is continually searching for ways to reduce accidents and/or severity of such accidents.

SUMMARY

Embodiments of the present disclosure address the aforementioned need and others by providing various types of information to the vehicle driver. Such information can be used by the vehicle driver singularly or in conjunction with other information available to the vehicle driver in order to allow the driver to operate the vehicle in an increasingly safe manner and/or to reduce the likelihood of property damage and/or possible bodily injuries to the driver, etc. In some embodiments, as will be described in more detail below, such information is presented to the driver as an augmented reality environment such that the driver can "see through" objects that may be occluding the driver's vision.

In accordance with an aspect of the present disclosure, a method implemented in computer-executable instructions for displaying information about vehicle surroundings to the driver of the vehicle is provided. The method includes obtaining vehicle environment data from one or more information sources. The vehicle environment data in one embodiment is indicative of at least a part of a scene occluded from view of a driver when operating the vehicle. The method also includes presenting to the driver of the vehicle, with the aid of the one or more displays, an augmented reality environment based on the vehicle surroundings data and representative of an area surrounding the vehicle but obstructed from operator view.

In accordance with another aspect of the present disclosure, a computer-readable medium is provided having modules for conveying information to a vehicle driver regarding vehicle surroundings. The one or more modules includes an information gathering module configured to collect data from one or more information sources associated with one or more sensing zones, an augmented reality image rendering module configured to generate from the collected data one or more virtual design elements representative of objects occluded from view of the vehicle driver, and a display module configured to cause the virtual design elements to be presented to a display.

In accordance with another aspect of the present disclosure, a system is disclosed for providing information to a vehicle driver. The system includes one or more displays, one or more information sources configured to generate data associated with one or more sensing zones located at one or more areas surrounding the vehicle, and a display generator coupled to the one or more information sources. The display generator in one embodiment is configured to: collect data from one or more information sources associated with one or more sensing zones; generate from the collected data one or more virtual design elements representative of objects occluded from view of the vehicle driver; and cause the virtual design elements to be presented to a display.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The present disclosure relates to a system of information gathering devices, displays and associated programmed hardware, and their methods of use, that provide, for example, increased driver visibility and blind spot prevention in vehicles, such as Class 8 trucks. The systems and/or methods can be employed alone or can be employed to augment other blind spot prevention aids, such as side view mirrors, etc. In some embodiments, the system is configured to employ augmented reality techniques and methodologies in order to "see-through" an obstruction in the driver's view. For example, it is known that a driver's view in a tractor-trailer combination is very limited when changing lanes or backing up, for example, into a tight loading dock, due to the presence of occluding vehicle objects, such as the semi-trailer, the sleeper cab, if equipped, other cab structure, combinations thereof, etc. As a result of the occluding objects being "virtually" removed by the systems and methods of the present disclosure, improved visibility to the driver is provided, and increased safety and reduced property damage may be achieved.

Figure 7:
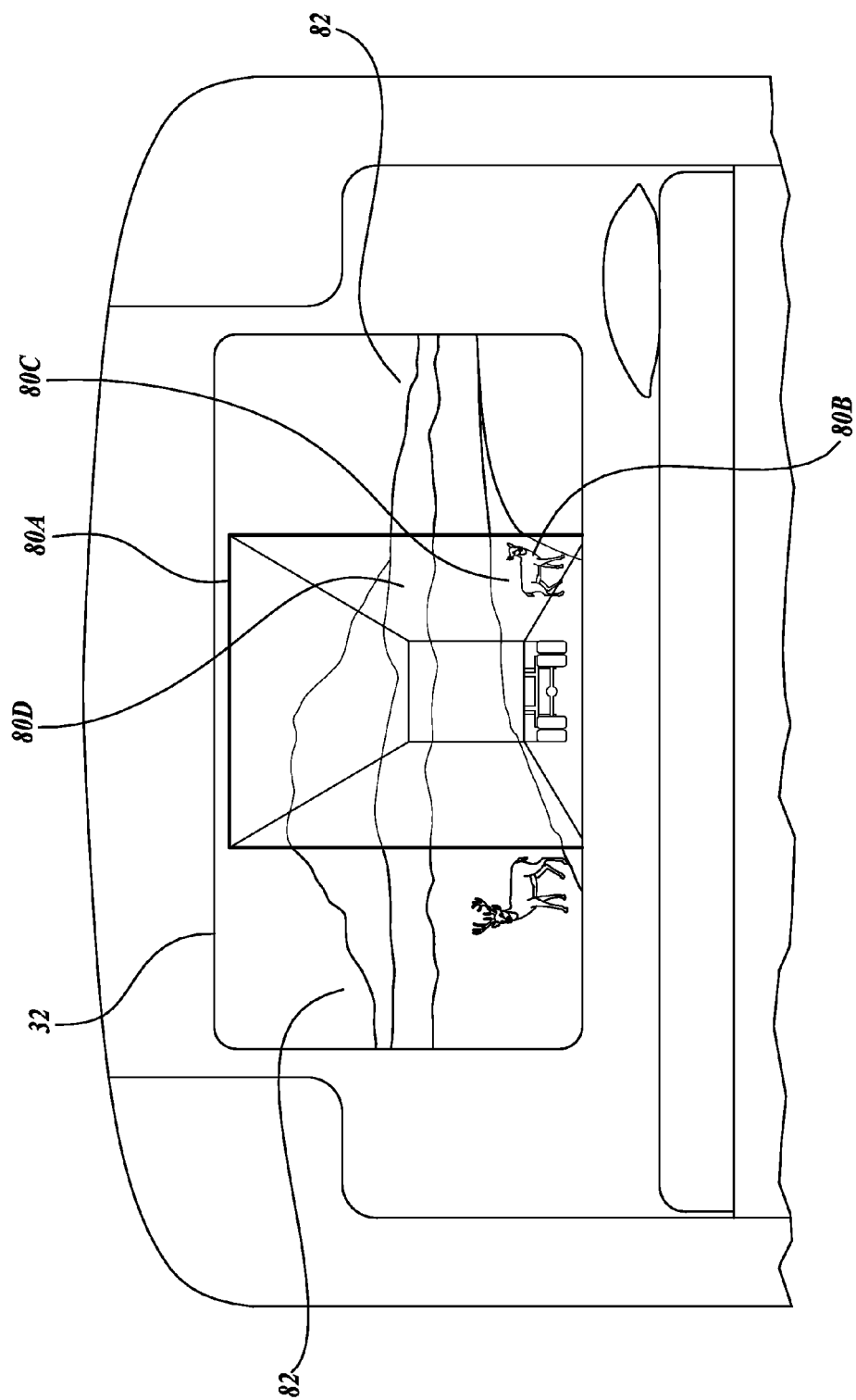
FIGS. 7-10 illustrate embodiments of one or more components of the safety system incorporated at various locations around the vehicle.
Figure 8:
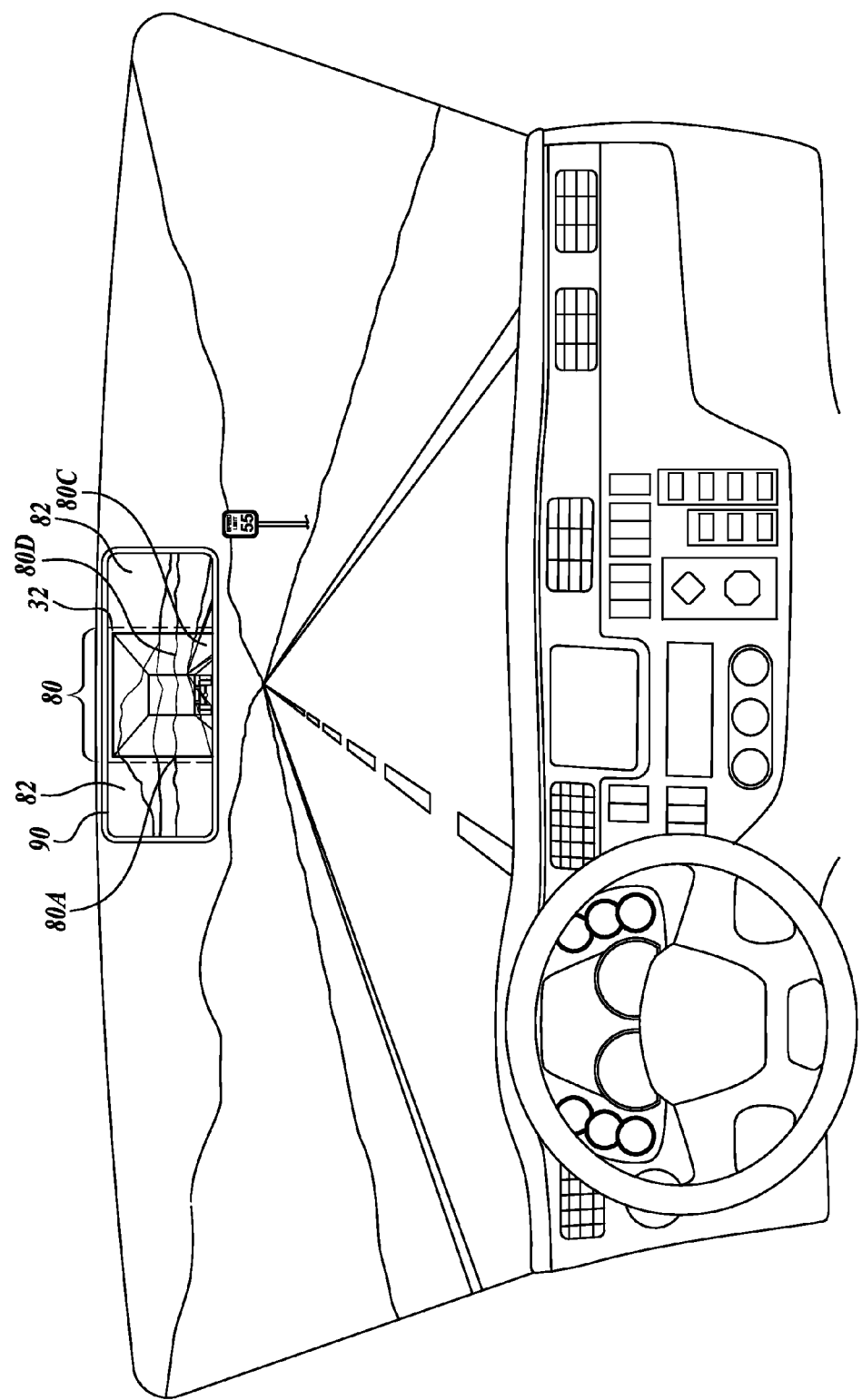
Figure 9:
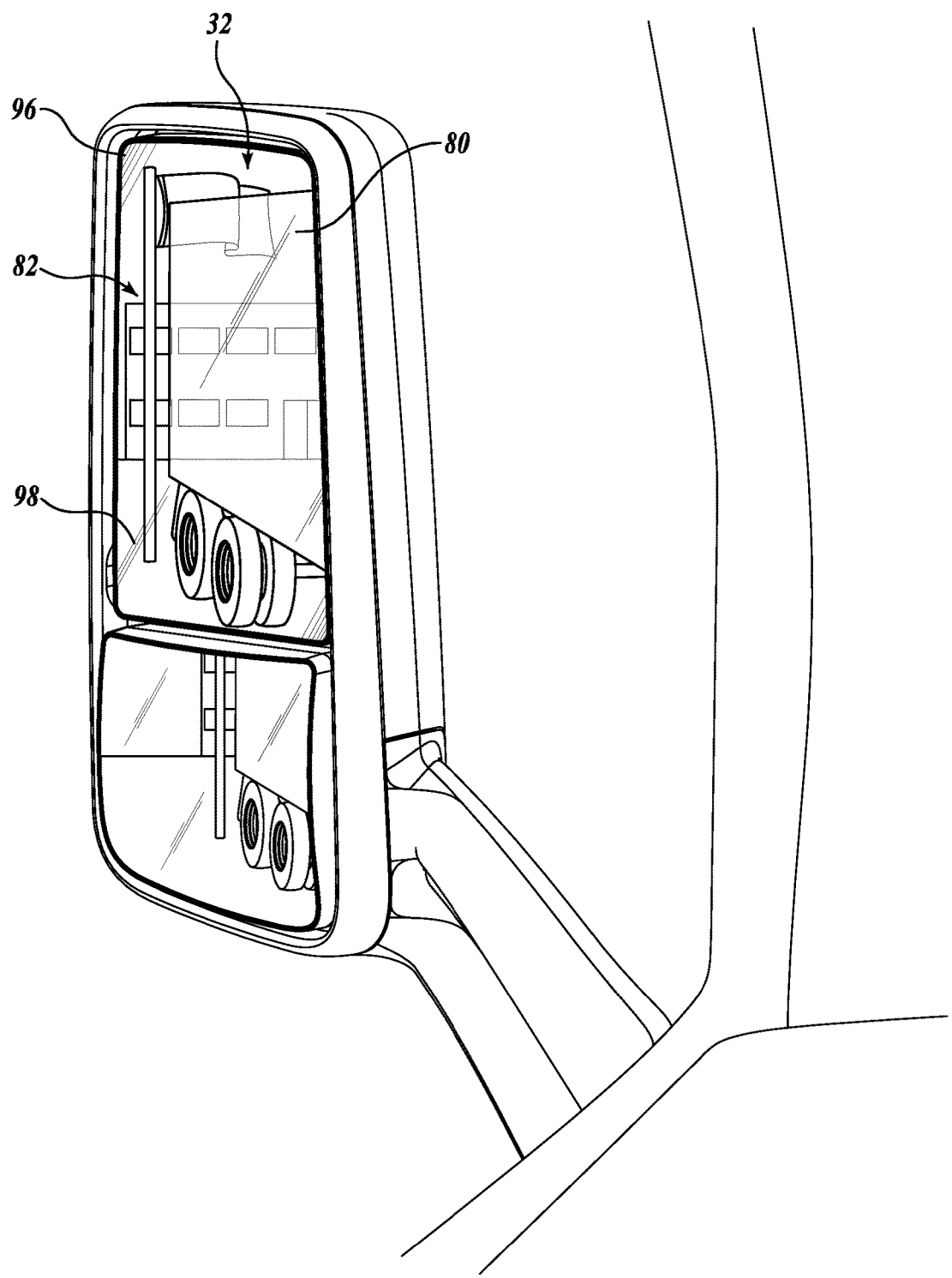
Figure 10:
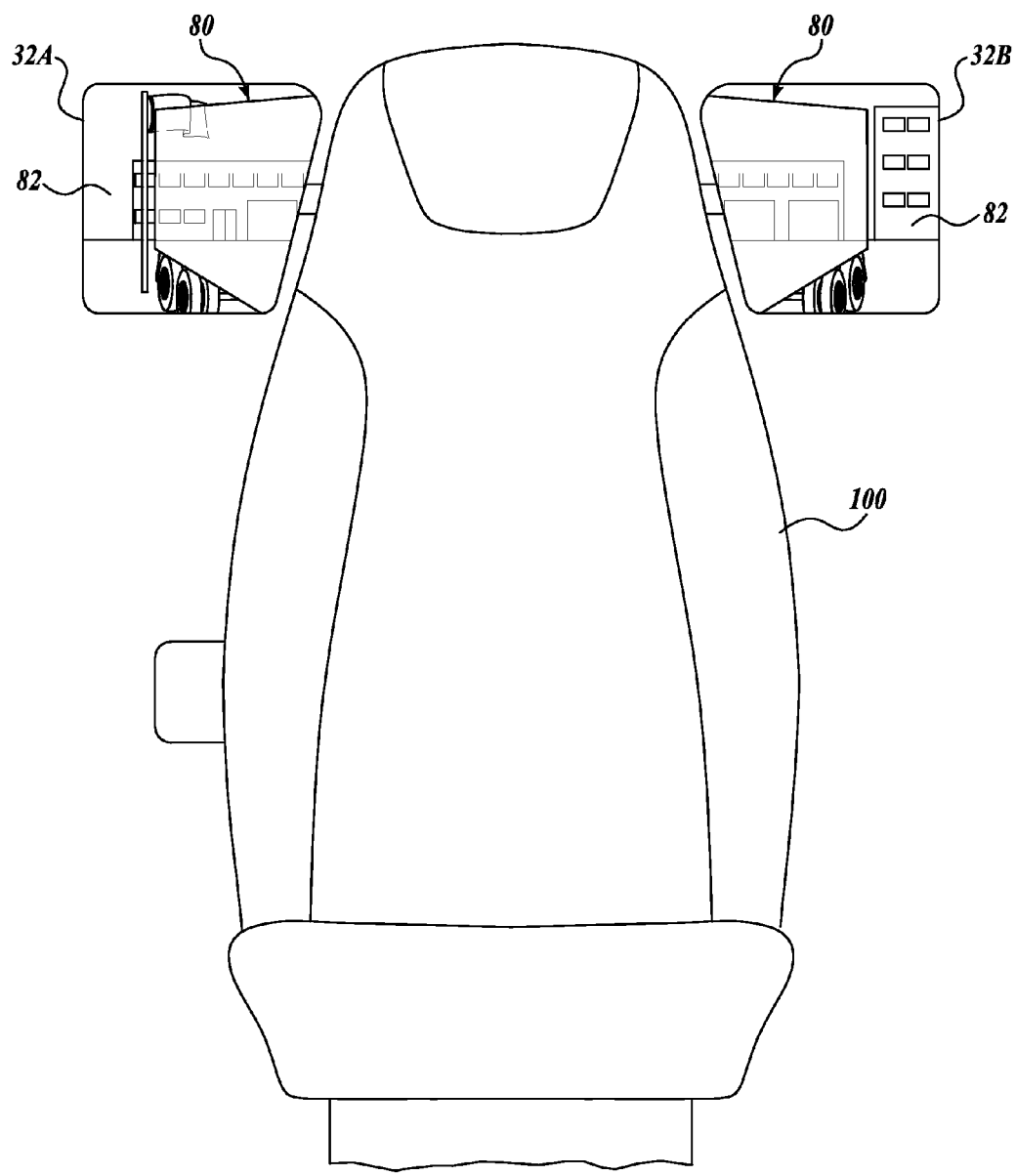

As will be described in more detail below, digital cameras, radar, lidar, thermal imaging devices and/or similar information gathering devices can be placed at various locations around the vehicle and/or associated trailer, if equipped. Additionally, one or more displays are placed around the vehicle at locations that may correspond to actual view points of the vehicle driver. Some examples of the placement of displays that will be described in more detail below include the following: (1) a display provided at the rear of the sleeper or day cab in order to present the rear scene looking behind an associated trailer, as shown in FIG. 7; (2) a display provided with the rear view mirror, as shown in FIG. 8; (3) a display provided with the side view mirrors to augment the viewing capabilities of the mirrors, as shown in FIG. 9; (4) one or more displays provided on each side of the driver seat, as shown in FIG. 10.

The term "augmented reality" as used throughout this detailed description and in the claims refers to any rendered image, article or object using a combination of real-world views that are merged with computer generated images. For purposes of clarity, the terms "real" and "virtual" are used throughout this detailed description and in the claims to distinguish between various types of images and/or objects. For example, a real view or real image refers to any view or image of a real environment that is occupied by a user. These views are typically reproduced with still or video cameras. In contrast, a virtual image or virtual object is any image or object that is generated by a computing device and which is associated with a virtual environment. Moreover, for purposes of clarity, the term "virtual design element" is used throughout this detailed description and in the claims to refer collectively to any type of virtual object, virtual image or virtual graphic that may be created by, or used with, the system.

An augmented reality environment can be created by the combination of virtual images or objects with a real views or images. In some embodiments that will be described in more detail below, the real objects or images are provided naturally by a mirror or like reflective surface or a transparent surface, such as a window. In other embodiments, the real objects or images are generated by, for example, one or more cameras and/or the like. It will be appreciated that the generation of an augmented reality environment or scene can use a single source of information, or a combination of any two or more sources of information described herein.

In the following description, numerous specific details are set forth in order to provide a thorough understanding of one or more embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

Although representative embodiments of the present disclosure is described with reference to Class 8 trucks, it will be appreciated that aspects of the present disclosure have wide application, and therefore, may be suitable for use with many types of vehicles, such as passenger vehicles, buses, RVs, commercial vehicles, light and medium duty vehicles, and the like. Accordingly, the following descriptions and illustrations herein should be considered illustrative in nature, and thus, not limiting the scope of the claimed subject matter.

Figure 1:
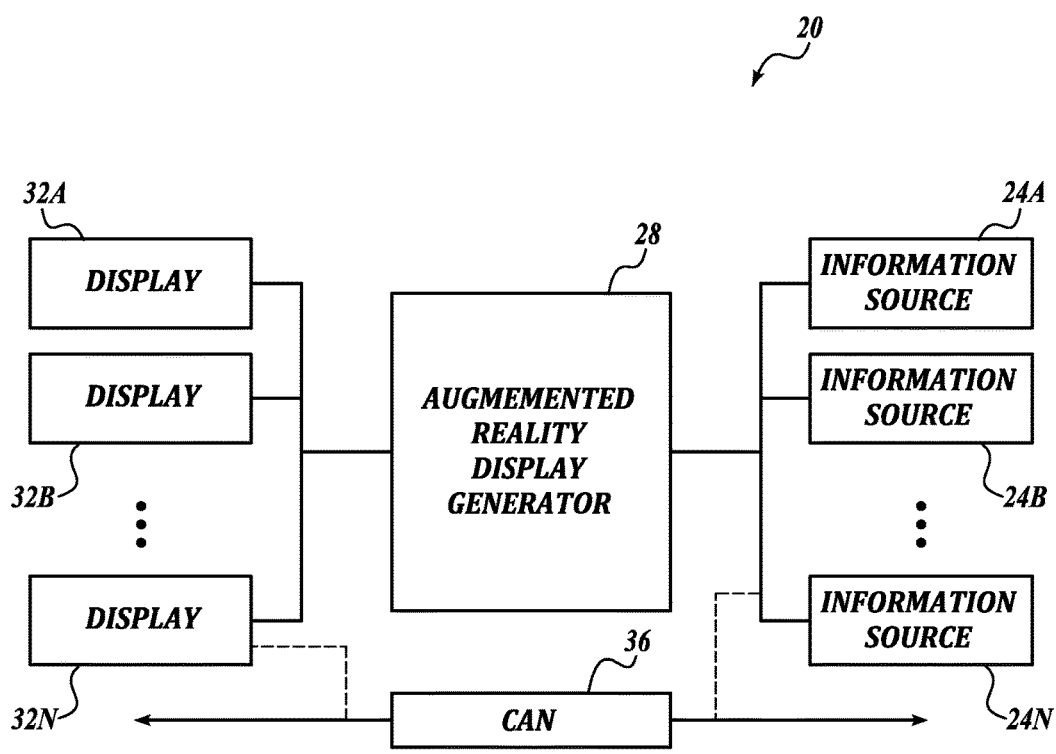
FIG. 1 is a block diagram of one representative embodiment of a vehicle safety system in accordance with one or more aspects of the present disclosure.

Turning now to FIG. 1, there is shown a schematic diagram of one example of a vehicle safety system, generally designated 20, in accordance with aspects of the present disclosure. The system 20 may be installed in a suitable vehicle (sometimes referred to herein as the "host vehicle") for providing one or more benefits to the driver, such as improved driver visibility, reduction of blind spots, etc. This may include detecting or sensing an environment composed of one or more foreign objects (e.g. target object(s)) in relation to the host vehicle, which, for example, could pose a potential safety concern to the driver of the host vehicle, to a pedestrian in the vicinity of the host vehicle, to a driver of an adjacent vehicle, etc. The system 20 is capable of detecting or sensing a wide variety of different target objects, including both moving and non-moving objects. For example, the target object can be a vehicle in an adjacent lane (e.g., a "side vehicle") or a vehicle approaching the vehicle from behind (e.g., a "rear trailing vehicle"). The target object may also be a pedestrian or animal either stationarily positioned or crossing behind the host vehicle, etc., or may be stationary, inanimate objects, such as trees, barriers, buildings, street signs, etc., on the periphery of or behind the vehicle.

Figure 2:
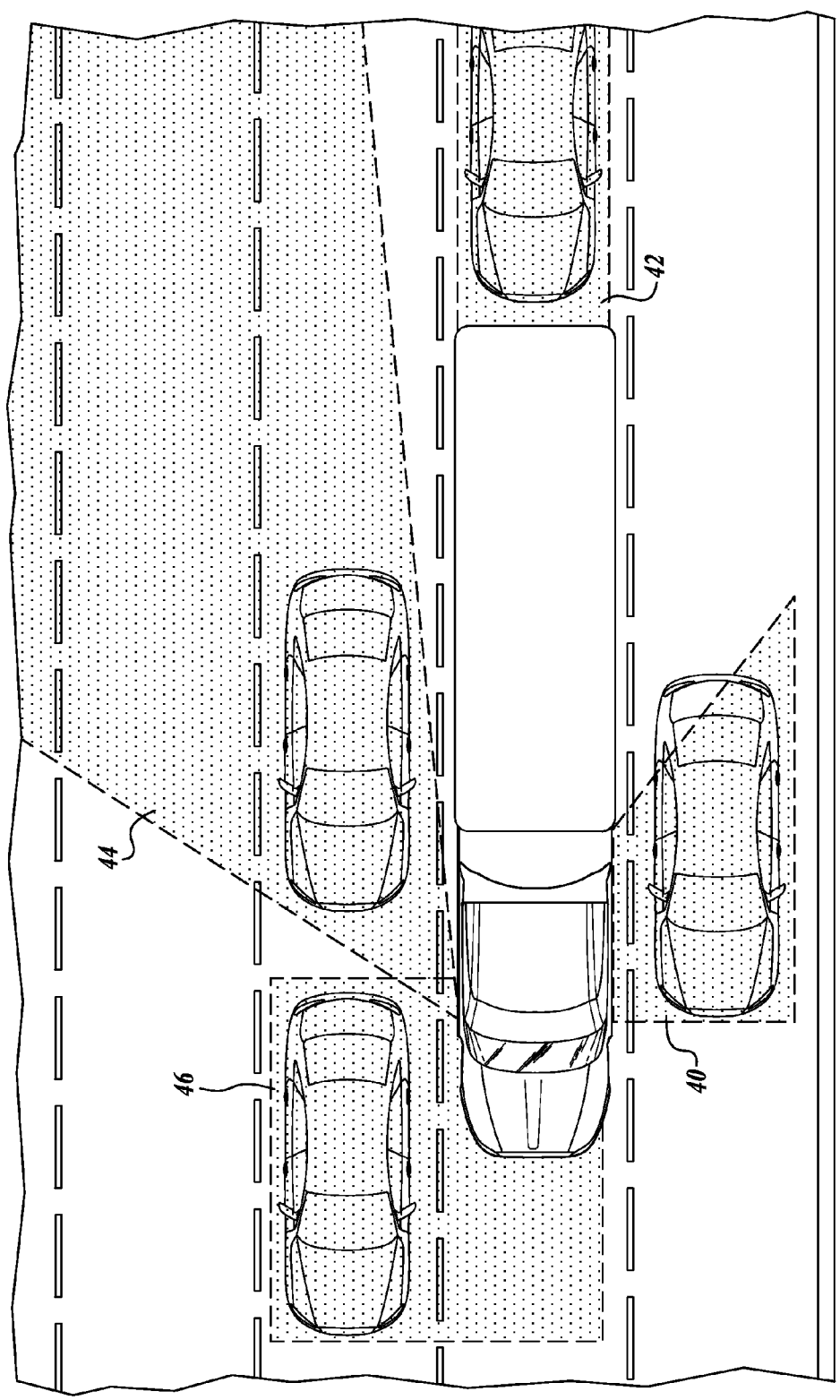
FIG. 2 is a schematic diagram illustrating a number of blind spots experienced by drivers of one representative vehicle.

As mentioned above, the target object(s) may be located in the blind spot or occluded area of the host vehicle. In that regard, FIG. 2 illustrates various blind spots common to conventional vehicles, such as a tractor-trailer combination. As shown in FIG. 2, typical blind spots include an area 40 located at the driver's side of the vehicle caused by the A pillar, the B pillar, the sleeper section or other structure of the cab. Area 40 is typically not accessible by the driver side mirrors. The blind spots also include an area 42 located behind the trailer. The blind spots also include an area 44 located at the passenger's side of the vehicle and at an angle with respect to the vehicle caused by the A pillar, the B pillar, the sleeper section or other structure of the cab. Area 44 is typically not accessible by the passenger side mirrors. In some instances, portions of area 44 may be slightly accessible by the side mirrors. The blind spots may also include an area 46 in front of the vehicle and to the passenger side of the vehicle caused by the front section/hood of the vehicle. Area 46 also extends rearwardly to include the area on the passenger side adjacent the vehicle front section/hood.

To sense one or more target objects in the vicinity of the vehicle, the vehicle safety system 20 collects information from various information sources 24 associated with the host vehicle. In some embodiments, the collected information represents data associated with the vehicle surroundings, sometimes referred to as the vehicle environment. In one embodiment, the collected information represents data associated at least in part with one or more blind spots of the vehicle driver, including areas 40, 42, 44, and 46. The information sources 24 can include, for example, devices such as digital cameras, radar, lidar, thermal imaging cameras, etc., which are mounted on or otherwise associated with the host vehicle in suitable locations for obtaining information related to the driver's various blind spots or other occluded areas. In another embodiment, the information sources 24 may include devices discrete from vehicle, such as traffic cameras, roadside beacons, components of system 20 or a similar system installed on third-party vehicles, which communicate with the host vehicle via cellular, short or long range RF, or similar protocols, and provide information related to the driver's various blind spots or other occluded areas. In these or other embodiments, the information sources 24 may also optionally include devices that collect or generate data indicative of vehicle operating parameters, such as vehicle speed, vehicle acceleration, etc.

In response to information collected by one or more of these information sources 24, or any combination thereof, the system 20 presents to the driver with the aid of one or more displays an augmented reality environment comprising a real image depicting a scene from the viewpoint of the driver and virtual design elements (e.g., person, animal, barrier, road, terrain, etc.) that are located in one of the driver's blind spots or occluded areas. In some embodiments, the virtual design elements also include the object (e.g., trailer, vehicle structure (e.g., hood, cab, etc.), etc.) that is occluding the view of the driver. As a result, the presence of the virtual design elements allows the driver to "see through" the occluding structures, such as the trailer, in order to increase driver visibility, etc.

Still referring to FIG. 1, the components of the system 20 will now be described in more detail. As shown in the embodiment of FIG. 1, the system 20 includes one or more information sources 24, an augmented reality display generator 28, and one or more displays 32. The display generator 28 is either directly connected in communication with one or more information sources 24 or can be connected to the one or more information sources 24 via a vehicle wide network 36, such as a controller area network (CAN). Those skilled in the art and others will recognize that the vehicle-wide network 36 may be implemented using any number of different communication protocols such as, but not limited to, Society of Automotive Engineers' ("SAE") J1587, SAE J1922, SAE J1939, SAE J1708, and combinations thereof. Direct connection can be carried out either wired or wirelessly, or both.

The information sources 24 in some embodiments can include but are not limited to digital cameras or other image gathering devices, optical sensors, radar, lidar, ultrasonic or other RF sensors, thermal imaging cameras, thermal sensors, proximity sensors, etc. In use, for example, a single device or sensor or a combination of two or more of these devices and/or sensors is capable of generating vehicle environment data, which may, for example, contain camera images, an infrared image, etc., of the environment surrounding the host vehicle. As will be described in more detail below, the information contained in this vehicle environment data can be used by the system 20 to either generate real images, virtual images, or both.

Figure 3:
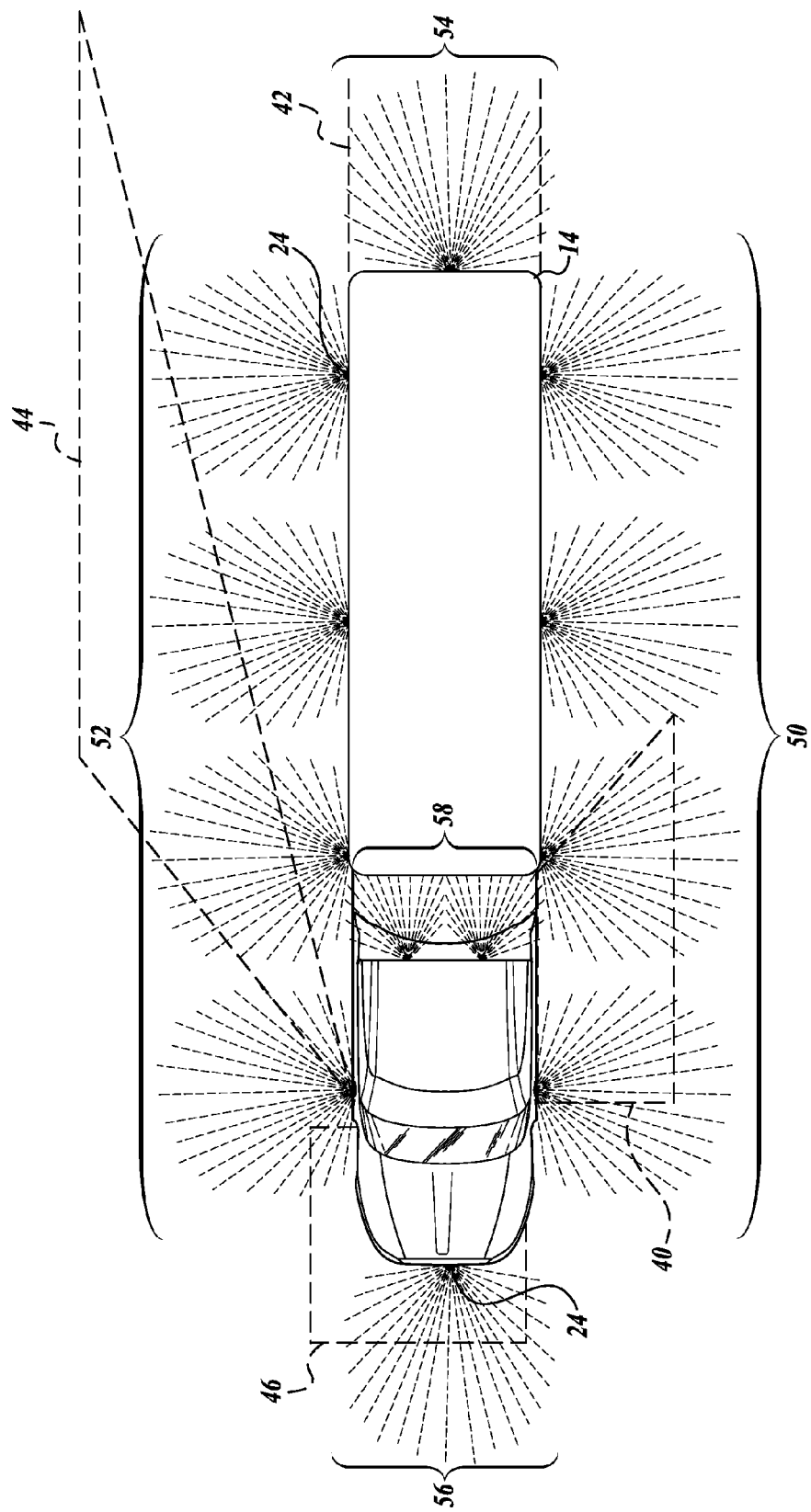
FIG. 3 is a schematic diagram illustrating a number of sensing zones monitored by the system of FIG. 1.

In some embodiments, the information generating sources 24 are mounted to or otherwise associated with the host vehicle at one or more desired information gathering locations. As can be appreciated, the location and number of devices that are used will depend upon the particular application and can be readily modified as conditions dictate. In the embodiment shown in FIG. 3, the information sources 24 are placed around host vehicle (shown as a tractor trailer combination) so as to form side sensing zones 50 and 52 and a rear sensing zone 54. In one embodiment, one or more information sources 24 can also be located around the host vehicle so as to form a front sensing zone 56. In another embodiment, one or more information sources 24 can also be located at the rear of the lead vehicle (e.g., tractor) so as to form a gap sensing zone 58.

In some embodiments, additional information sources 24 can be optionally employed in order to carry out one or more functions of the system 20. In that regard, some embodiments of the system 20 also employ various vehicle system sensors or the like, including brake sensors, wheel speed sensors, a vehicle speed sensor, transmission gear sensor, accelerometers, a steering angle sensor, etc. Information from these additional information sources can be used in conjunction with the information sources associated with the sensing zones 50, 52, 54, 56, and 58 in some embodiments in order to carry out various functionality of the system 20.

At least one of the information sources 24 of the vehicle safety system 20 in some embodiments may optionally include a data acquisition unit that comprises one or more receivers. In these embodiments, the data acquisition unit is configured to receive, for example, information from information sources discrete from the host vehicle, such as short-range communication devices (transmitters or the like from other vehicles in the vicinity of the host vehicle that are equipped with the system 20 or similar functionality, road side or traffic intersection beacons, traffic cameras, etc.). Information that can be transmitted to the vehicle 20 includes but is not limited to one or more of the following: vehicle operating data, blind spot data related to the host vehicle or to the transmitting vehicle, and incident data. In some embodiments, the data acquisition unit may also include transmitters or can be equipped with transceivers in order to transmit information generated by system 20 to other vehicles in the vicinity of the host vehicle.

In one embodiment, the system 20 may be used in conjunction with other vehicle safety systems or functionality, such as adaptive cruise control, autonomous driving, collision avoidance, collision warning, lane departure warning, lane change/merge detection, object detection, vehicle path prediction, rear impact collision warning/avoidance, road condition detection, just to name a few. In that regard, the system 20 in one embodiment is configured to receive and/or share data with these optional vehicle systems in order to carry out the functionality of the system 20.

The information from at least one these information sources 24, or any combination of these information sources 24, can be processed by the display generator 28 or other components so that an augmented reality environment can be presented to the vehicle driver with the aid of one or more of the displays 32. As was described briefly above and will be described in more detail below, the augmented reality environment in some embodiments is created by the combination of a real image and one or more virtual design elements, which is presented together to the vehicle driver.

In various embodiments of the system 20, the one or more displays 32 can include a generally opaque display, for example, a liquid crystal display (LCD), a light emitting polymer display (LPD), a plasma display, or a light emitting diode (LED) display. In these embodiments, the augmented reality environment can be presented to the driver entirely by the opaque display. In other embodiments of the system 20, the one or more displays can include transparent displays or "see through" displays, such as transparent LCD, OLED or Head-up displays (HUD). In one embodiment, the transparent display can be fabricated as a layer of OLEDs sandwiched between two transparent pieces of film (e.g., silicon or plastic film, etc.). In these embodiments, as will be described in more detail below, the transparent displays can be either mounted directly over a mirror of the vehicle, such as a rearview mirror, a side view mirror, etc., or can overlay a vehicle window or sections thereof, such as a rear window or front windshield of the vehicle. As such, the augmented reality environment is presented to the vehicle driver by a combination of a reflective or transparent layer (e.g., mirror, window, etc.) of the vehicle, which allows real images to be presented naturally to the driver via transmission of light, and a transparent display 32, which provides the virtual design elements to the driver.

In accordance with an aspect of the present disclosure, the display generator 28 is configured to: (1) collect information from one or more information sources 24; (2) generate virtual design elements based on the collected information; and (3) present the augmented reality environment or portions thereof to the vehicle driver via at least one of the one or more displays 32. As will be described in more detail below, the virtual design elements can include target objects, such as people, animals, posts, building structure, etc., as well as portions of the environment occluded by the host vehicle. As presented to the vehicle driver, the augmented reality environment provides a "see through" effect in order to represent information to the driver that would be normally hidden or obscured from view.

Figure 4:
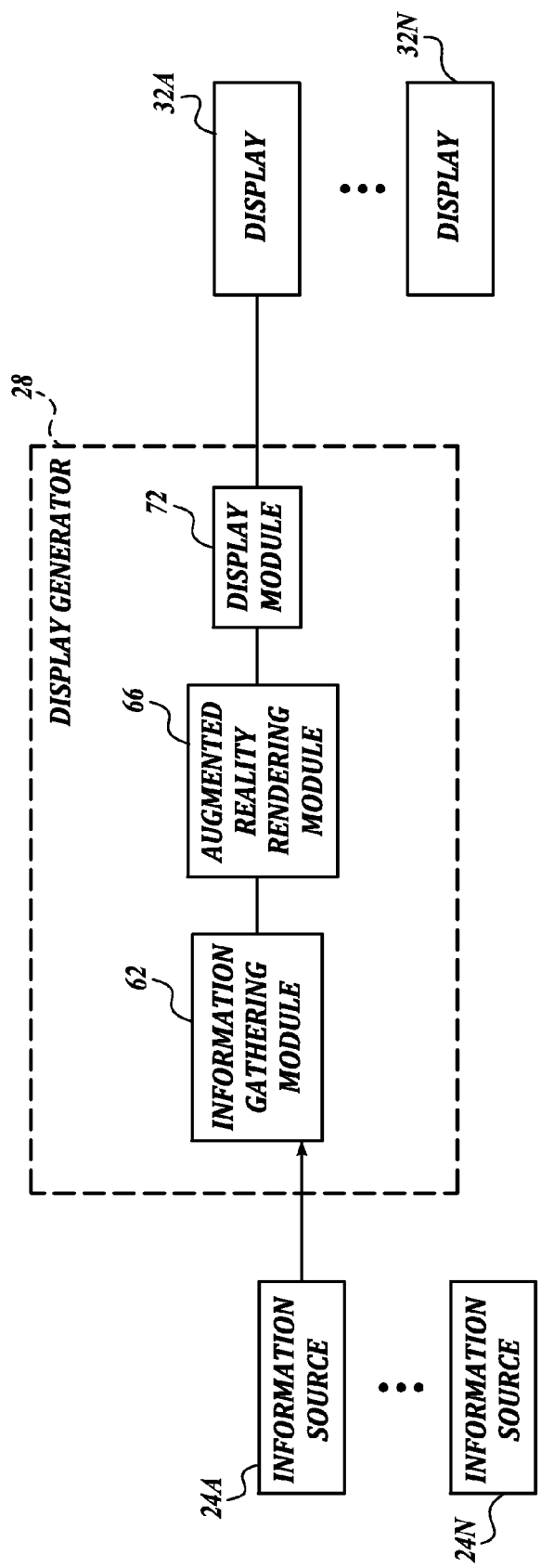
FIG. 4 is a block diagram of one representative embodiment of the augmented reality display generator of FIG. 1.

Turning now to FIG. 4, there is shown in block diagrammatic form one representative embodiment of the display generator 28 formed in accordance with an aspect of the present disclosure and capable of carrying out the functionality described above. As shown in FIG. 4, the display generator 28 includes one or more modules. In the embodiment shown, the display generator 28 includes an information gathering module 62, an augmented reality rendering module 66, and a display module 72. While the modules are separately illustrated in the embodiment shown, it will be appreciated that the functionality carried out by each module can be combined into fewer modules or further separated into additional modules. In some embodiments, the modules of the display generator 28 contain logic rules for carrying out the functionality of the system. The logic rules in these and other embodiments can be implemented in hardware, in software, or combinations of hardware and software.

Still referring to FIG. 4, the information gathering module 62 implements logic for obtaining real-time or near real time data from the information sources 24. The data can include images, video, etc., associated with one or more of the side sensing zones 50 and 52, the rear sensing zone 54, the front sensing zone 56, and the gap sensing zone 58. In some embodiments, only one zone is needed to generate the augmented reality environment. In other embodiments, a combination of two or more zones is used to generate the augmented reality environment or scene. The data can also optionally include vehicle operating data, or data from external sources (third party vehicles, beacons, traffic cameras, etc.) representing images or video associated with one or more of the various sensing zones. During the acquisition process, data received from the information sources 24 can be processed and temporary stored, such as in memory and/or an associated buffer.

The augmented reality rendering module 66 implements logic for generating virtual design elements for the augmented reality environment based on information obtained from the information gathering module 62. In doing so, the augmented reality rendering module 66 can interpret various types of information and employ various augmented reality rendering engines for generating the augmented reality environment. In one embodiment, the module 62 can convert radar, lidar, and/or thermal imaging into virtual design elements that graphically represent a scene, an image, or objects therein that are hidden or occluded from view of the driver. In another embodiment, the module 66 converts a camera image into virtual design elements that graphically represent a scene, an image, or objects therein that are hidden or occluded from view of the driver. In some embodiments, the augmented reality rendering module 78 also implements logic for presenting real images for the augmented reality environment based on information obtained from the information gathering module 62. In some of these embodiments, the module 62 combines the real images and the virtual images in a suitable manner to form the augmented reality environment.

As further illustrated in FIG. 4, the display generator 28 further includes a display module 72. The display module 72 implements logic for causing the virtual design elements generated by the augmented reality rendering module 78 to be presented to the display 32 for display. In some embodiments, the display module 72 is further configured to present the virtual design elements together with the real images for display. It will be appreciated that know image processing, buffering, and/or the like can occur at one or more of the modules 62, 66, and 72.

Figure 5:
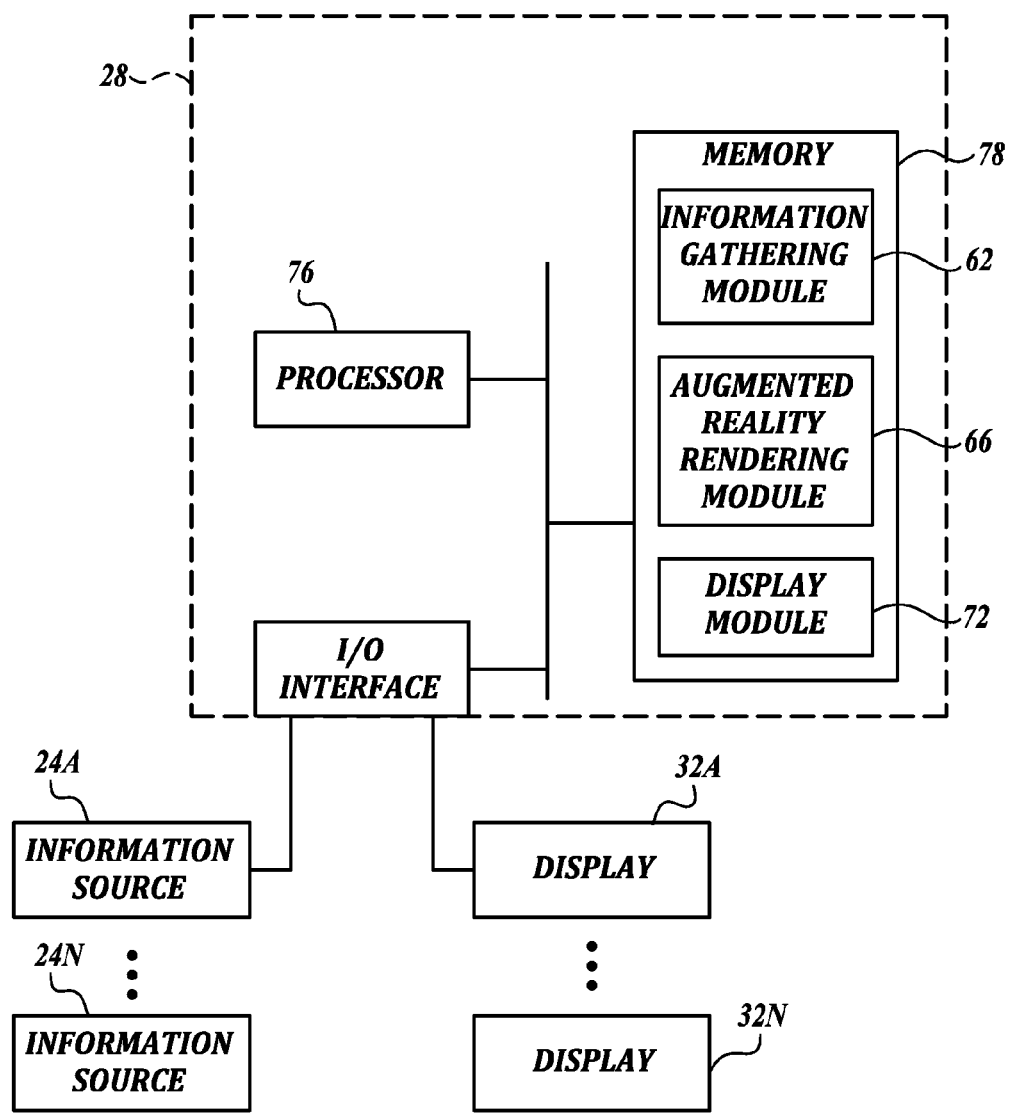
FIG. 5 is a block diagram of another representative embodiment of an augmented reality display generator in accordance with an aspect of the present disclosure.

FIG. 5 illustrates another suitable embodiment of the display generator 28 in block diagrammatic form. As shown in FIG. 5, the display generator 28 includes a processor 76 and memory 78. The memory 78 may include computer readable storage media in read-only memory (ROM), random-access memory (RAM), and keep-alive memory (KAM), for example. The KAM may be used to store various operating variables or program instructions while the processor 76 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc. In the embodiment shown, a data acquisition module 62, an augmented reality 66, and a display module 66 are stored in memory 78. In some embodiments, the display generator 28 may include additional components including but not limited to, analog to digital (A/D) and digital to analog (D/A) circuitry, input/output circuitry and devices (I/O) and appropriate signal conditioning and buffer circuitry.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the term "module" can include logic that may be implemented in either hardware or software, or combinations thereof.

Figure 6:
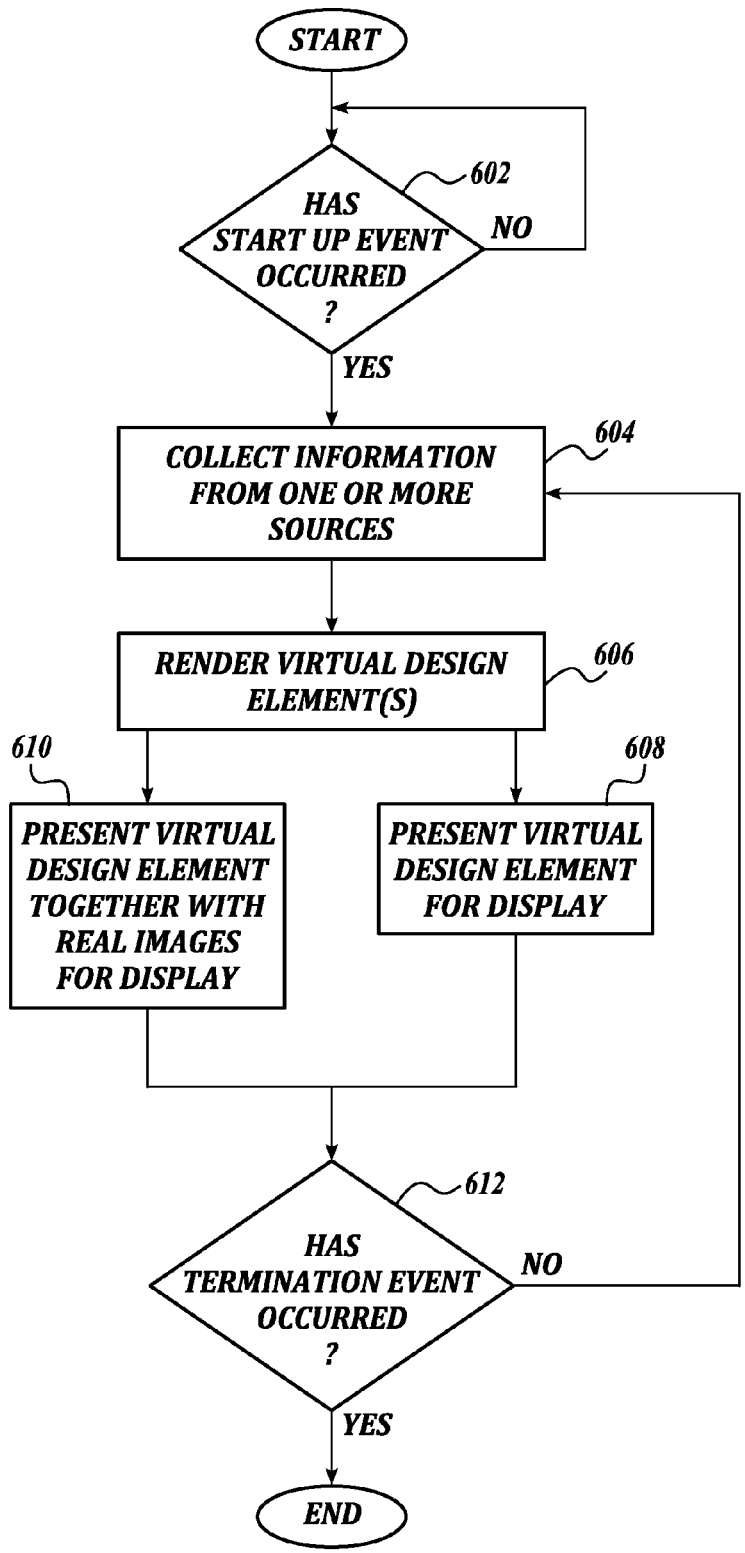
FIG. 6 is a flow diagram illustrating one representative embodiment of an augmented reality display method in accordance with an aspect of the present disclosure.

FIG. 6 is a flow diagram that depicts one exemplary embodiment of an augmented reality display method 600 formed in accordance with the disclosed subject matter. In one embodiment, the method 600 may be implemented by the modules 62, 66, and 72 of the display generator 36 from either FIG. 4 or 5. Accordingly, information may be collected or otherwise received from one or more information sources 24, converted into an augmented reality environment or virtual design elements thereof, and presented to the vehicle driver with the aid of one or more displays 32. As a preliminary matter, those skilled in the art will appreciate that such functionality is typically designed to be carried out in a continual manner, i.e., once initialized and operating, the display generator 28 continually monitors and displays information. Accordingly, the method 600 operates continually until the display generator is powered down or its operation is otherwise interrupted.

As illustrated in FIG. 6, the routine 600 begins at block 602 where a start-up event occurs that will cause an augmented reality environment to be presented to the vehicle driver with the aid of one or more displays 32. Generally described, a start-up event is an event type that will cause the display 32 to transition from an inactive state to an active state. By way of example only, the start-up event that occurs at block 602 may be the ignition of the vehicle's engine, which results in power being supplied to an ignition bus. Also, the display 32 may be put to "sleep" in a reduced power state when the vehicle is inactive for a predetermined period of time. Thus, the start-up event may be another type of event, such as the return of the display 32 from a reduced power state.

If a start event occurs at block 602, the method 600 proceeds to block 604, where the display generator 28 begins collecting information from the one or more information sources 24 indicative of one or more events occurring in one or more of the sensing zones 50, 52, 54, 56, and 58. Next, at block 606, the display generator 28 renders one or more virtual design elements 80 representative of occluded objects located in one or more of the sensing zones for subsequent display. In one embodiment, the virtual design elements 80 are rendered based on the driver's view point. In some embodiments, the virtual design elements 80 can include, for example, a general outline of the occluding structure, such as the trailer, and any target objects that may be occluded thereby. For example, the virtual design elements 80 can include an animal 80B, the road 80C, and the terrain 80D, that is normally occluded by the trailer, as shown in FIG. 7. The virtual design elements 80 can also include vehicle structure 80A, such as the outline of the trailer, that is responsible for the occluded view. In some embodiments, the rendered virtual design elements 80 can be temporarily stored in memory 58 or an associated buffer. This information may be continually collected and processed so that current events can be conveyed on one or more displays 32.

From block 606, the method proceeds to block 608, where the virtual design elements are then presented to a display 32 for display. Once received by the display 32, the virtual design elements are rendered by display 32, as shown in the examples of FIGS. 7-10. In some embodiments that employ an opaque display, the virtual design elements 80 are presented to the display 32 in conjunction with real images 82. For example, real images 82 can be obtained or converted from the information provided from the information sources 24. In this embodiment, the display generator 28 overlays, superimposes or otherwise combines the virtual design elements 80 with the real images 82 to form an augmented reality environment at block 610 for display. In other embodiments, the display generator 28 takes the real image of the vehicle environment and converts only that portion of the real image that is occluded from the view of the driver into virtual design elements 80 in order to form an augmented reality environment. In some embodiments, the real images 82 can be temporarily stored in memory 58 or an associated buffer. This information may be continually collected and processed so that current events can be conveyed on one or more displays 32.

The method 600 then proceeds to block 612, where a determination is made as to whether a process termination event has occurred. The termination event can be turning the ignition key to the "off" position, powering down the system 20 or one or more displays 32, or placing one or more of the displays 32 in sleep or stand-by mode, etc. If a termination event occurs at block 612, then the method 600 ends. If not, the method returns to block 604 so that a continuous feed is presented to the display 26.

It should be well understood that the routine 600 described above with reference to FIG. 6 does not show all of the functions performed when presenting the augmented reality environment to the driver. Instead, the routine 600 describes exemplary embodiments of the disclosed subject matter. Those skilled in the art and others will recognize that some functions may be performed in a different order, omitted/added, or otherwise varied without departing from the scope of the claimed subject matter.

Carrying out the one or more embodiments of the method 600 results in augmented reality environments depicted schematically in the examples of FIGS. 7-10. For ease of illustration, the real images 82 are shown with thicker lines, which appear darker in the FIGURES, while the virtual design elements are shown with thinner lines, which appear lighter in the FIGURES.

FIG. 7 is a schematic representation of a display 32 employed in lieu of the rear window of the host vehicle. As shown in FIG. 7, the augmented reality environment is created by the virtual design elements 80A-80D and the real image 82 presented by the display 32. In the embodiment shown, the virtual design elements include the outline of the occluding structure 80A, the animal 80B, the road 80C, and the terrain 80D, which are normally occluded by the trailer. In generating the virtual design elements 80, information based on sensing zones 50, 52, 54, and/or 58 can be used. In this embodiment, the real image 82 includes the scene behind the tractor that is not occluded by the trailer. In other embodiments, instead of an opaque display, a transparent display can be used in conjunction with the rear window in order to present the augmented reality environment to the driver.

FIG. 8 is a schematic representation of a display 32 mounted over a section of the rear view mirror 90. As shown in FIG. 8, the augmented reality environment is created by the virtual design elements 80 presented by display 32 and the real image 82 presented by the reflective surface of the mirror 90. In the embodiment shown, the virtual design elements include the trailer outline 80A, the road 80C, and the terrain 80D normally occluded by the trailer.

FIG. 9 is a schematic representation of a display 32 mounted over a section of the side view mirror 96. As shown in FIG. 9, the augmented reality environment is created by the virtual design elements 80 presented by display 32 and the real image 82 presented by the reflective surface 98 of the mirror 96. Of course, some embodiments can employ an opaque display in lieu of the side mirror, as well. In the embodiment shown, the virtual design elements 80 include building 80E, portions of the flag 80F, and the outline of the trailer 80A, FIG. 10 is a schematic representation of two displays 32A and 32B mounted on the sides of the driver seat 100. As shown in FIG. 10, the augmented reality environment is created by both the virtual design elements 80 and the real images 82 presented by displays 32A and 32B. In this embodiment, the augment reality environment includes the occluded areas on the passenger and driver side of the trailer, which may be based on information from sensing zones 50, 52, and/or 54. The augment reality environment presented by such displays 32A and 32B can be used in conjunction with either traditional side mirrors, or side mirrors configured as described in FIG. 9. Of course, some of the information regarding the side sensing zones can be obtained from other vehicles in the vicinity of the host vehicle.

Other applications of one or more embodiments of the system 20 are contemplated in accordance with one or more aspects of the present disclosure. For example, the system 20 in one embodiment may be alternatively or additionally configured to employ a heads up display (HUD) as one of the displays 32 for presenting different configurations of the hood to the driver. In one embodiment, the display generator 28 of the system 20 is configured to generate virtual design elements in the form of the vehicle hood and objects that are present in area 46 (See FIG. 2) but occluded by the front section/hood of the vehicle. In another embodiment, the display generator 28 of the system 20 is configured to generate either virtual design elements or a real representation of a vehicle hood from a different vehicle model. For example, the host vehicle may be a commercial truck, such as the Peterbilt® 389 semi truck that is equipped with a "long" hood, but the system 20 may present through the HUD a virtual hood representative of a shorter version of the hood, sometimes referred to as the "aero" hood, or vice versa.

In yet other embodiments, the system 20 may utilize information from other systems 20 installed in either trailing vehicles or leading vehicles. For example, if the host vehicle is part of a vehicle platoon (i.e., two or more vehicles one in front of the other), the system 20 of the host vehicle can communicate with the other vehicle(s) in order to provide the driver of the host vehicle with an augmented reality environment of what is in front of the lead vehicle, or what is behind the trailing vehicle. As such, the augmented reality environment presented by the system 20 of the host vehicle allows the driver to "see through" the lead vehicle (the lead vehicle transmits information from in front of the lead vehicle, including area 46), thereby reducing driver eye fatigue, or allows the driver to "see through" the trailing vehicle (the trailing vehicle transmits information from behind the trailing vehicle, including from area 42), thereby providing the driver with additional information regarding the environment.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. In a vehicle platoon including a host vehicle controlled by a first driver and a trailing vehicle that is physically separate from and behind the host vehicle and is controlled by a second driver, the host vehicle having one or more displays, and the trailing vehicle having an information source mounted thereon, a method implemented in computer-executable instructions for displaying information about vehicle surroundings to the first driver, the method comprising:

obtaining vehicle environment data from one or more information sources, the vehicle environment data indicative of at least a part of a scene occluded from view of the first driver when operating the host vehicle, wherein the one or more information sources include the information source mounted to the trailing vehicle, wherein the vehicle environment data includes a real image from the information source mounted to the trailing vehicle, and wherein the real image depicts an area behind the trailing vehicle that is occluded from view of the first driver by the trailing vehicle; and presenting to the first driver, with the aid of the one or more displays, an augmented reality environment based on the vehicle environment data and representative of an area surrounding the host vehicle but obstructed from view of the first driver;

wherein said presenting includes causing the one or more displays to render at least a portion of the real image of the area occluded from view of the first driver by the trailing vehicle.

2. The method of claim 1, wherein said presenting includes
causing the one or more displays to render one or more virtual design elements representative of one or more objects located in the scene occluded from view of the first driver.

3. The method of claim 1, wherein said presenting includes
generating one or more virtual design elements representative of one or more objects located in the scene occluded from view of the first driver;
obtaining a real image of the scene, the real image based on the point of view of the first driver; and
causing the virtual design elements and the real image to be displayed together by the one or more displays.

4. The method of claim 3, wherein said causing the virtual design elements and the real image to be displayed together by the one or more displays includes
arranging the generated one or more virtual design elements over a preselected area of the real image.

5. The method of claim 1, wherein said obtaining vehicle environment data includes
obtaining additional data from a source discrete from the host vehicle, the external source including one of a beacon and a traffic camera.

6. The method of claim 1, wherein the vehicle environment data is associated with one or more sensing zones that correspond to one or more external areas of the host vehicle, wherein the one or more external areas of the host vehicle represent at least in part areas occluded from view of the first driver when operating the host vehicle.

7. A non-transitory computer-readable medium having modules for conveying information to a first driver of a host vehicle in a vehicle platoon regarding vehicle surroundings, wherein the vehicle platoon includes the host vehicle and a trailing vehicle that is physically separate from and behind the host vehicle and controlled by a second driver, the modules comprising:
an information gathering module configured to collect data from one or more information sources associated with one or more sensing zones, wherein the one or more information sources include an information source mounted to the trailing vehicle, wherein the data includes a real image from the information source mounted to the trailing vehicle, wherein the real image depicts an area behind the trailing vehicle that is occluded from view of the first driver by the trailing vehicle;

an augmented reality image rendering module configured to generate from the collected data one or more virtual design elements representative of objects occluded from view of the first driver; and a display module configured to:
cause the virtual design elements to be presented to a display; and
cause the real image of the area occluded from view of the first driver by the trailing vehicle to be presented to a display.

8. The computer-readable medium of claim 7, wherein the display module is further configured to cause the real image to be presented with the virtual design elements, wherein the real image and the virtual design elements together form an augmented reality environment.

9. The computer-readable medium of claim 8, wherein the augmented reality image rendering module is further configured to arrange and align the generated one or more virtual design elements over a preselected area of the real image.

10. The computer-readable medium of claim 7, wherein the one or more information sources include information sources selected from the group consisting of a digital camera, a thermal imaging device, radar, and lidar.

11. The computer-readable medium of claim 7, wherein the one or more sensing zones correspond to one or more external areas of the host vehicle.

12. The computer-readable medium of claim 11, wherein the one or more external areas of the host vehicle represent at least in part areas occluded from view of the first driver when operating the host vehicle.

13. A system for providing information to a first driver of a host vehicle of a vehicle platoon, wherein the vehicle platoon includes the host vehicle and a trailing vehicle that is physically separate from and behind the host vehicle and is controlled by a second driver, the system comprising:
one or more displays; and
a display generator communicatively coupled to one or more information sources configured to generate data associated with one or more sensing zones located at one or more areas surrounding the host vehicle, wherein the one or more information sources include an information source mounted to the trailing vehicle, wherein the data includes a real image from the information source mounted to the trailing vehicle, and wherein the real image depicts an area behind the trailing vehicle that is occluded from view of the first driver by the trailing vehicle;

wherein the display generator is configured to:
collect data from the one or more information sources associated with the one or more sensing zones;
generate from the collected data one or more virtual design elements representative of objects occluded from view of the first driver;
cause the virtual design elements to be presented to a display; and
cause at least a portion of the real image of the area occluded from view of the first driver by the trailing vehicle to be presented to a display.

14. The system of claim 13, wherein the one or more displays include a transparent display configured to overlay one of a transparent layer and a reflective layer.

15. The system of claim 14, wherein the transparent layer includes a window and the reflective layer includes a mirror.

16. The system of claim 15, wherein the mirror includes one of a side mirror and a rear view mirror.

17. The system of claim 13, wherein the display generator includes a memory storing one or more modules having program instructions for conveying vehicle information on the display; and
a processor configured to execute the program instructions of the one or more modules.

18. The system of claim 13, wherein the one or more information sources include information sources selected from the group consisting of a digital camera, a thermal imaging device, radar, and lidar.

19. The system of claim 13, wherein one of the one or more information sources includes a receiver configured to receive data associated with the one or more sensing zones from a source discrete from the host vehicle, wherein the source discrete from the host vehicle is one of a beacon and a traffic camera.

* * * * *